United States Patent
Okita et al.

(10) Patent No.: US 6,770,152 B1
(45) Date of Patent: Aug. 3, 2004

(54) ROLLING BEARING

(75) Inventors: Shigeru Okita, Yokohama (JP);
Akihiro Kiuchi, Oiso-machi (JP);
Hiromichi Takemura, Yokohama (JP);
Tomonobu Yoshikawa, Yokohama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/830,212

(22) PCT Filed: Sep. 1, 2000

(86) PCT No.: PCT/JP00/05966

§ 371 (c)(1),
(2), (4) Date: Apr. 24, 2001

(87) PCT Pub. No.: WO01/18273

PCT Pub. Date: Mar. 15, 2001

(30) Foreign Application Priority Data

Sep. 3, 1999 (JP) .............................................. 11-250042
May 12, 2000 (JP) ....................................... 2000-139278

(51) Int. Cl.[7] .......................... C22C 38/22; C22C 38/18
(52) U.S. Cl. ....................... 148/334; 148/319; 148/906; 384/492
(58) Field of Search ................................. 148/906, 319, 148/334; 384/492

(56) References Cited

U.S. PATENT DOCUMENTS

| | | | |
|---|---|---|---|
| 4,992,111 A | | 2/1991 | Yamada et al. |
| 5,413,643 A | * | 5/1995 | Murakami et al. ........... 148/906 |
| 5,439,300 A | | 8/1995 | Hirakawa et al. |
| 5,639,168 A | | 6/1997 | Noguchi et al. ............. 384/492 |
| 6,012,851 A | | 1/2000 | Hirakawa et al. ........... 384/569 |
| 6,357,924 B1 | * | 3/2002 | Takemura et al. ........... 384/492 |

FOREIGN PATENT DOCUMENTS

| | | |
|---|---|---|
| DE | 4406252 | 11/1994 |
| DE | 198 42 455 | 4/1999 |
| FR | 2635336 | 2/1990 |
| GB | 2235698 | 3/1991 |
| GB | 2278127 | 11/1994 |
| GB | 2 281 106 | 2/1995 |
| JP | 3-253542 | 11/1991 |
| JP | 6-33441 | 5/1994 |
| JP | 6-307457 | 11/1994 |
| JP | 7-103241 | 4/1995 |
| JP | 8-73988 | 3/1996 |
| JP | 8-312651 | 11/1996 |
| JP | 10-68419 | 3/1998 |
| JP | 11-93956 | 4/1999 |

OTHER PUBLICATIONS

German Examination Report.

* cited by examiner

*Primary Examiner*—Deborah Yee
(74) *Attorney, Agent, or Firm*—Crowell & Moring LLP

(57) ABSTRACT

The present invention provides a rolling bearing having high wear resistance at high temperature and with reduced manufacturing cost. At least one of an inner ring, an outer ring and rolling elements is formed of the following steel material into a predetermined shape, then applied with hardening and tempering at a temperature of 240° C. or higher or 350° C. or lower to make the Vickers hardness (Hv) on the raceway surface and/or rolling surface to 720 or more. The steel material contains, as the alloy ingredient, 0.8% by weight or more and 1.2% by weight or less of C, 0.5% by weight or more and 2.5% by weight or less of Si, 0.7% by weight or more and 1.5% by weight or less of Cr, 0.8% by weight or more and 2.0% by weight or less of Mo and 0.3% by weight or more and 1.2% by weight or less of Mn, with a ratio of Mo to Cr (Mo/Cr: weight ratio) of 1.1 or more.

11 Claims, 6 Drawing Sheets

ROLLING BEARING

TECHNICAL FIELD

The present invention relates to a rolling bearing suitable to automobiles and industrial machines such as construction machines and iron and steel making machines and, particularly, suitable for the use in environments of severe lubrication conditions (for example, at high temperature).

The present invention also relates to a rolling bearing suitable, for example, to ① rotational supporting use in information equipment such as hard disk drives (HDD), video tape recorders (VTR) and digital audio tape recorders (DAT), ② supporting use for swinging portions of swing arms as constituent components such as of HDD and ③ rotational supporting use for those equipments requiring quietness such as motors for blowers, motors for cleaners and vehicle turbo chargers.

Furthermore, this invention relates to a rolling bearing suitable to use undergoing fitting stress to an inner ring relative to a shaft and used at high temperature and lubrication with intrusion of obstacles.

BACKGROUND ART

Heretofore, high carbon chromium steels such as SUJ 2 have been mainly used as steel materials for rolling bearings but high speed steel materials such as AISI-M50 have been used in such uses as requiring high performance at high temperature (for example, bearings for use in aircraft jet engines). However, since the materials contain many alloy elements and require complicate heat treatment steps, the cost of the obtained bearings is expensive.

Japanese Published Unexamined Patent Application Hei 3-253542 discloses a steel containing Si and Mo having high softening resistance at high temperature more than SUJ 2 and containing an appropriate amount of Cr. This publication discloses that the fatigue life characteristic of rolling bearings at high temperature can be improved while keeping the manufacturing cost lower by the use of such steels.

Further, Japanese Published Examined Patent Application Hei 6-33441 describes bearing rings formed by using a steel containing, on the weight ratio, 0.95 to 1.10% of carbon, 1 to 2% of silicon or aluminum, 1.15% or less of manganese and 0.90 to 1.60% of chromium, with an oxygen content of 13 ppm or less, with the amount of residual austenite being restricted to 8% or less by conducting tempering at a temperature of 230° C. to 300° C. after hardening and with a hardness of HRC60 or more. Further, this invention intends to provide a rolling bearing ring having high dimensional stability and extended rolling life even in use at high temperature.

Further, Japanese Published Unexamined Patent Application Hei 10-68419 describes a rolling bearing in which carbides and/or carbonitrides with the maximum grain size of 5 μm or less are precipitated at the surface layer of bearing rings and/or rolling elements, and the surface hardness of the bearing ring and/or rolling element is Hv 600 or more and 700 or less at 300° C. According to this rolling bearing, while wear resistance at high temperature can be improved, manufacturing cost is increased since a carburization treatment or carbonitriding treatment is required during manufacture.

However, the rolling bearings disclosed in each of the publications still have a room for the improvement in view of the wear resistant at high temperature or manufacturing cost.

On the other hand, rolling bearings used for rotational support in those equipments requiring quietness as in ①–③ described above are required to have satisfactory acoustic characteristics at low torque (less noise). Therefore, bearing components such as inner rings, outer rings and rolling elements are finished at high dimensional accuracy. Further, the inner rings, outer rings and the rolling elements are formed of high carbon chromium bearing steels such as SUJ 2 or martensitic stainless steels such as SUS440C and then manufactured by applying hardening tempering and the hardness of the raceway surface is defined as HRC 58 to 64.

In recent years, since information equipments have been reduced in size and often adapted for portable use, they have more worry of undergoing impact shocks upon dropping or exposure to vibrations. Correspondingly, a worry of damages has also been increased for rolling bearings in the equipments. In small-sized ball bearings used for portable information equipments, since the contact ellipsis formed at the contact surface between the bearing ring and the rolling element is small, when impact load is applied, the contact portion suffers from permanent deformation to sometimes cause indentation at the raceway surface even when this is a relatively small impact load. As a result, there may be a worry for the deterioration of acoustic characteristics or occurrence of unevenness in the rotational torque.

Prior art for overcoming the problems can include, techniques as described in Japanese Published Unexamined Patent Application Hei 7-103241 and Japanese Published Unexamined Patent Application Hei 8-312651.

Japanese Published Unexamined Patent Application Hei 7-103241 describes that the amount of the residual austenite in the steel forming the raceway surface is decreased as low as 6% by volume or less to improve the indentation resistance of the raceway surface thereby avoiding permanent deformation of the raceway surface when impact load is applied to the rolling bearing. For example, after forming a bearing ring with SUJ 2, it is hardened at a hardening temperature of standard heat treatment (820 to 860° C.) and then subjected to sub zero treatment, or tempered at a relatively high temperature of 220 to 240° C. thereby decreasing the amount of the residual austenite as less as possible while maintaining required hardness for the raceway surface.

Japanese Published Unexamined Patent Application Hei 8-312651 discloses that a bearing ring is formed with usual bearing steel (high carbon chromium bearing steel such as of case hardened steel or SUJ 1–3) and then applied with a carbonitriding hardening treatment and tempering at a temperature of 350° C. or higher thereby reducing the amount of the residual austenite of steels forming the raceway surface to 0%, for improving the indentation resistance at the raceway surface.

It also discloses that the bearing ring is formed of a steel prepared by adding an element providing a tempering resistance and then applied with quench hardening and tempering at a temperature of 350° C. or higher to reduce the amount of the residual austenite of the steel forming the raceway surface to 0%. Further, it discloses that no indentation by contact with the raceway surface is formed to the rolling element, by making the rolling element with ceramic material.

However, in the prior art described above, there is still a room for the improvement in view of the acoustic characteristics when impact load is applied.

On the other hand, self alignment roller bearings used, for example, in paper making machine are sometimes used under high fitting stress in excess of 100 MPa (average stress along the cross section of an inner ring for the tension applied in the circumferential direction of the inner ring) in order to prevent creeping caused between a shaft and a bearing inner ring. In such a case, an inner ring having an inner diametrical portion fabricated into a tapered shape is press fit into a tapered shaft so as to facilitate application of fitting stress. As the inner ring of such a shape, those prepared by applying quenching and tempering treatment to fully cured steels such as high carbon chromium bearing steels (C: about 1 wt %, Cr: about 1.5 wt % content) are generally used.

Then, when the inner ring comprising the fully hardened steel is used under fitting stress in excess of 100 MPa, the inner ring may sometimes be cracked in the axial direction with non-metal inclusions present near the raceway surface as initiation points depending on the combination of the fitting stress and the rolling stress.

For preventing such cracking fracture of the inner ring, there is a general knowledge that improvement of the compressive residual stress on the raceway surface or the fracture toughness of the material per se is effective. Based on this knowledge, the compressive residual stress at the raceway surface has been increased by applying an austemper treatment to fully hardened steels, or by using carburized steels.

However, among the prior art described above, the method of applying the austempering to the fully hardened steel can not prevent the crack fracture of the inner ring in a case of use under a high fitting stress as exceeding 130 MPa since the compressive residual stress capable of providing to the raceway surface by the austempering is about −100 MPa.

The method of using the carburized steel is effective also for preventing cracking fracture of the inner ring used under a fitting stress in excess of 130 MPa since a compressive residual stress of about −200 MPa can be provided to the raceway surface by controlling the conditions for carburization, hardening and tempering. However, in a case of applying the carburization to those steel materials with low carbon content, for example, of about 0.20% by weight, it involves a drawback that the time for carburization treatment is longer. Since the carburizing time is in proportion with the square of the carburizing depth, this results in a problem of worsening the productivity and increasing the cost, particularly, in medium to large size bearings requiring deep carburized layer.

In order to overcome this problem, Japanese Published Unexamined Patent Application Hei 6-307457 discloses a rolling bearing in which an inner ring is formed by carburizing or carbonitriding an alloy steel with a carbon content of 0.3 to 0.7% by weight, in which the carbon content at the surface layer of the inner ring on the side of the raceway surface ($C_1$) is 1.3% by weight or less and the difference of the carbon content ($C_1$) at the surface layer and the carbon content ($C_2$) in the core portion ($\Delta C = C_1 - C_2$) is 0.4% by weight or more.

Also for such a rolling bearing used under application of fitting stress to the inner ring, there is a demand for improving the life when it is used under high temperature and lubrication with intrusion of obstacles.

A first subject of the present invention is to provide a rolling bearing having high wear resistance under high temperature and with reduced manufacturing cost.

A second subject of the present invention is to provide a rolling bearing of excellent acoustic characteristics when undergoing impact loads, suitable for use in small sized information equipments for portable use.

A third object of the present invention is to provide a rolling element having an inner ring capable of enduring the use at high fitting stress exceeding 130 MPa, having a longer life under high temperature and lubrication with intrusion of obstacles and with less manufacturing cost.

DISCLOSURE OF THE INVENTION (First Rolling Bearing)

In order to solve the first subject described above, the present invention provides a rolling bearing in which at least one of an inner ring (a shaft in a case where an inner ring raceway surface is formed to the shaft), an outer ring and an rolling element is formed of a steel material containing, as alloy ingredients, 0.8% by weight or more and 1.2% by weight or less of C, 0.5% by weight or more and 2.5% by weight or less of Si, 0.7% by weight or more and 1.5% by weight or less of Cr, 0.8% by weight or more and 2.0% by weight or less of Mo and 0.3% by weight or more and 1.2% by weight or less of Mn, with a ratio of Mo to Cr (Mo/Cr: weight ratio) of 1.1 or more into a predetermined shape, then applied with hardening, and then applied with tempering at a temperature of 240° C. or higher and 350° C. or lower to make the Vickers hardness (HV) at the raceway surface and/or rolling surface to 720 or more. The rolling bearing is referred to as a first rolling bearing.

According to the first rolling bearing, since at least one of the bearing members (inner ring, outer ring and rolling element) is formed of the steel material described above, wear resistance at high temperature can be increased without carburization treatment or carbonitriding treatment. Particularly, when the ratio of Mo and Cr contained in the steel material used is defined as Mo/Cr≧1.1, the formulation balance between Mo carbides and Cr carbides is improved to dispersingly precipitate fine carbides ($M_{23}C_6$ type), so that satisfactory wear resistance can be obtained.

Further, when the content for each of the ingredients in the steel material used is defined within the predetermined range and the tempering temperature is set to 240° C. or higher and 350° C. lower to make the Vickers hardness (HV) at the raceway surface and/or rolling surface to 720 or more, hardness and wear resistance capable of enduring high temperature use can be obtained.

Further, for suppressing the dimensional change upon long time use at high temperature, the amount of the residual austenite after tempering is preferably defined as 2.0% by volume or less. The tempering temperature has to be higher in order to decrease the amount of the residual austenite but hardness tends to be lowered as the tempering temperature goes higher. Accordingly, the hardness and the dimensional stability are compatibilized by defining the tempering temperature to 240° C. or higher and 350° C. or lower.

Critical meanings for the range of the content of each of the ingredients is to be described below.

(C: 0.8% by weight or more and 1.2% by weight or less)

C (carbon) is an element for providing steels with hardness. For ensuring a sufficient hardness for inner and outer rings and rolling elements of a bearing after the structure is made martensitic by hardening and after tempering at a temperature of 240° C. or higher and 350° C. or lower, the C content has to be 0.8% by weight or more.

Further, if the C content is excessively high, macro carbides tend to be formed. Since the macro carbides possibly form initiation points for flaking, the rolling fatigue life of the rolling bearing is lowered if the C content is excessively high. In order not to form macro carbides, the C content is defined as 1.2% by weight or less.

(Si: 0.5% by Weight or More and 2.5% by Weight or Less)

Si (silicon) is an element acting as a deoxidizer upon steel making and providing steels with anti-temperability. Such effects can not be obtained substantially if the Si content is less than 0.5% by weight.

Further, if the Si content is excessively high, cutting property or forgeability is deteriorated. Accordingly, the upper limit of the Si content is defined as 2.5% by weight (preferably, 2.0% by weight).

(Cr: 0.7% by Weight or More and 1.5% by Weight or Less)

Cr (chromium) is an element having an effect of improving the hardenability and providing the steel with a anti-temperability and it is also an element of forming chromium carbides. If the Cr content is less than 0.7% by weight, such effect can not substantially be obtained.

On the other hand, if the Cr content is excessively high, macro carbides tend to be formed, which cause lowering of the rolling contact fatigue life of rolling bearings. Further, when the Cr content is higher, the material cost is increased since an expensive Mo has to be added in a great amount so as to attain: Mo/Cr≧1.1. Further, if the Cr content exceeds 1.5% by weight, the effect of improving the wear resistance obtained by the relation: Mo/Cr≧1.1 is saturated. Accordingly, the Cr content is defined as 1.5% by weight or less.

(Mo: 0.8% by Weight or More and 2.0% by Weight or Less)

Mo (molybdenum) is an element of providing the steel with anti-temperability and it is also an element of forming carbides. If the Mo content is less than 0.8% by weight, such effects can not be obtained substantially.

On the other hand, if the Mo content is excessively high, the workability is lowered. Further, if the Mo content exceeds 2.0% by weight, the effect of improving the wear resistance obtained by making: Mo/Cr≧1.1 is saturated to merely result in increased material cost. Accordingly, the Mo content is defined as 2.0% by weight or less.

(Mn: 0.3% by Weight or More and 1.2% by Weight or Less)

Mn (manganese) is an element having an effect of improving the hardenability, which is an element essential to bearing steels. If the Mn content is less than 0.3% by weight, no sufficient effect can be obtained.

On the other hand, if the Mn content exceeds 1.20% by weight, the workability is lowered and inclusions possibly causing lowering of the bearing life tend to be formed. Accordingly, the Mn content is defined as 1.2% by weight or less.

(Second Rolling Bearing)

For solving the second subject described above, the present invention provides a rolling bearing having an outer ring, an inner ring or a shaft in a case where an inner ring raceway surface is formed to a shaft in which at least one of the inner ring (or shaft) and the outer ring is formed of a steel material containing, as the alloy ingredients, 0.8% by weight or more and 1.2% by weight or less of C, 0.5% by weight or more and 2.5% by weight or less of Si, 0.7% by weight or more and 1.5% by weight or less of Cr, 0.8% by weight or more and 2.0% by weight or less of Mo and 0.3% by weight or more and 1.2% by weight or less of Mn into a predetermined shape, then applied with hardening and tempering, with a ratio of Mo to Cr (Mo/Co; weight ratio) at a position from the surface of a raceway surface to a core portion by a size corresponding to 2% of a diameter of a rolling element (position for 2% Da depth) is 1.1 or more, a Vickers hardness (HV) at the position is 720 or more and the amount of the residual austenite at the position is 1.0% by volume or less. The rolling bearing is referred to as a second rolling bearing.

"Elastic Coefficient of Metal Material" page 11, book published from The Japan Society of Mechanical Engineers (October 1980) describes that "Referring to the elastic coefficient of a solid solubilized alloy, when solute atoms are interstitial atoms the elastic coefficient is always lowered since crystal lattices are disturbed greatly". That is, even when the hardness of the raceway surface is identical, the elastic coefficient of the bearing ring is lowered to lower the contact pressure between the bearing and the rolling element as the crystal lattice in the steel constituting the bearing ring is disturbed more, the indentation resistance is improved.

On the other hand, According to "Metal Data Book" published from The Japan Institute of Metals, page 8 (July 1974), the atomic radius of iron (Fe) is 1.24 Å, the atomic radius of chromium (Cr) is 1.25 Å and the atomic radius of molybdenum (Mo) is 1.36 Å. Further, for both chromium and molybdenum, Cr and Mo atoms are substituted for Fe atoms when they are solid solubilized in iron. In this case, when the Cr atom having substantially the same atomic radius as iron is replaced for the Fe atom, no significant distortion is caused to the crystal lattice in the steel. When Mo atom is substituted for the Fe atom, since there is a difference of the atomic radius between both of them, large distortion is caused to the crystal lattice in the steel if hardening is caused by martensitic transformation while Mo is solid solubilized as it is.

However, if only Mo is added in a great amount, it is bonded with C to form Mo carbides and the amount of Mo solid solubilized into the matrix is not sometimes increased. Further, since Mo is an expensive material compared with Cr, it is desirable that the addition amount is kept as less as possible.

The present inventors have found that Mo is efficiently solid-solubilized in the matrix by making the Mo to Cr ratio (Mo/Cr: weight ratio) in the steel constituting a bearing ring to 1.1 or more thereby enabling to make the distortion of the crystal lattice greater in the steel constituting the bearing ring.

The indentation resistance is particularly improved by increasing the elasticity forming performance at a position in the direction of the depth of the raceway surface where a maximum shearing stress is applied. The position in the direction of the depth of the raceway surface where the maximum sharing stress is applied varies depending on the factors in the bearing design and working conditions, and it is typically "position from the raceway surface to a core portion corresponding to 2% of a diameter of a rolling element (position for 2% Da depth)".

Therefore, according to the second rolling bearing of present invention, particularly preferred indentation resistance can be obtained by not only defining the Vickers hardness (HV) as 720 or more (preferably, 750 or more) at the position for 2% Da depth and reducing the amount of the residual austenite at that position to 1.0% by volume or less but also making the ratio of Mo to Cr (Mo/Cr: weight ratio) at that position to 1.1 or more.

Further, vanadium (V) having an atomic radius of 1.31 Å and tungsten (W) having an atomic radius of 1.37 Å can also cause great distortion to the crystal lattice in the steel like that molybdenum (Mo) since they have a difference in the atomic radius relative to iron. Accordingly, a steel material further containing V and/or W in addition to each of the ingredients described above may also be used. In this case, the ratio for the total content of Mo, V and W to Cr ((Mo+V+W)/Cr: weight ratio) at the position for 2% Da depth is defined as 1.1 or more.

The upper limit for the ratio of Mo to Cr at the position for 2% Da depth is a value (2.86) calculate based on the lower limit for the Cr content (0.7% by weight) and the upper limit for the Mo content (2.0% by weight) in the steel material to be used.

In the second rolling bearing according to the present invention, at least one of the inner ring (or shaft) and the outer ring is formed of a steel material containing, as the alloy ingredient, 0.8% by weight or more and 1.2% by weight or less of C, 0.5% by weight or more and 2.5% by weight or less of Si, 0.7% by weight or more and 1.5% by weight or less of Cr, 0.8% by weight or more and 2.0% by weight or less of Mo and 0.3% by weight or more and 1.2% by weight or less of Mn.

The critical meaning for the range of each of the contents of the ingredients in the second rolling bearing is basically identical with the case of the first rolling bearing described above. However, the description for the Mo content that "the effect of improving the wear resistance obtained by defining as: Mo/Cr≧1.1" should be changed in the second rolling bearing as "the effect of improving the impact resistance obtained is saturated by defining as: Mo/Cr≧1.1".

In the second rolling bearing according to the present invention, it is preferred to apply a sub-zero treatment after hardening to induce transformation of residual austenite into martensite, thereby reducing the amount of the residual austenite and then apply tempering. When the residual austenite is decomposed as much as possible before tempering by applying the sub-zero treatment before tempering, distortion of the lattice in the martensitic structure after hardening is increased to promote the effect of reducing the elastic coefficient described above.

In the second rolling bearing according to the present invention, it may suffice that at least the inner ring (shaft in a case where the inner ring raceway surface is formed to the shaft) in the inner ring and the outer ring has the foregoing constitution but it is preferred that both of the inner ring and the outer ring have the constitution described above.

In the second rolling bearing according to the present invention, the rolling element has no particular restriction and it may be made of SUJ 2 used so far, made of ceramics or made of stainless steels. When the rolling element is made of ceramics, fretting resistance is improved outstandingly compared with the case where the rolling element is made of metal. However, when the bearing ring is an existent product, since a large contact pressure is caused between the raceway surface and the ceramic rolling element, the indentation resistance at the raceway surface is lowered.

On the contrary, in the second rolling bearing according to the present invention, since the bearing ring is constituted as described above, the indentation resistance at the raceway surface can be kept high even when the rolling element is made of ceramics. Accordingly, in the rolling bearing of the present invention, the fretting resistance can be improved while keeping the indentation resistance at the raceway surface high by using a rolling element made of ceramics.

As the rolling element constituting the second rolling bearing according to the present invention, a rolling element formed of a stainless steel containing 8% by weight or more (preferably 12% by weight or more) of Cr, in which a nitride layer is formed on the surface by a nitriding treatment and a core portion has a total content of nitrogen and carbon of 0.45% by weight or more is preferred. Softening of the core portion by high temperature tempering after the nitriding treatment can be prevented by making the total content for nitrogen and carbon in the core portion to 0.45% by weight or more.

Further, when nitride forming elements such as Mo, V, W, Nb, Al and Si are further added to the stainless steel, since fine nitrides thereof are formed, durability of the rolling element is further improved, so that such elements are preferably added in an appropriate amount in view of the cost.

Further, as a combination of the rolling element and the bearing ring (an inner ring or a shaft having the inner ring raceway surface and an outer ring), it is preferred that the difference between the surface hardness of the rolling element and the hardness of the bearing ring at a position for 2% Da depth is HV 300 or more and, more preferably, HV 500 or more. This can provide a higher effect for improving the impact resistance (indentation resistance).

(Third Rolling Bearing)

For solving the third subject described above, the present invention provides a rolling bearing in which an inner ring has the following constitution. The inner ring is formed of a steel material containing as, the alloy ingredient, 0.3% by weight or more and 0.7% by weight or less of C and 0.7% by weight or more and 1.5% by weight of less of Cr into a predetermined shape, applied with a carbonitriding treatment and hardening and tempering, in which a Vickers hardness (HV) at the raceway surfaces 700 is or more and an absolute value for the compressive residual stress at the raceway surface is 160 MPa or more. The rolling bearing is referred to as a third rolling bearing.

A carburizing treatment may be applied instead of the carbonitriding treatment so long as "Vickers hardness (HV) at the raceway surface of 700 or more, absolute value of a compressive residual stress at the raceway surface of 160 MPa or more" is obtained.

According to the third rolling bearing, since the absolute value for the compressive residual stress at the raceway surface of the inner ring is 160 MPa or more, cracking fracture of the inner ring is prevented even in a case of use under application of high fitting stress of 130 MPa or more to the inner ring. If the carbon content in the steel material used exceeds 0.7% by weight, the absolute value for the compressive residual stress at the raceway surface is less than 160 MPa. If the carbon content is less than 0.3% by weight, it takes much time for the carbonitriding treatment.

A carbonitriding time required for applying a predetermined amount of carbonitridation to an identical depth was examined while changing the carbon content in the alloy steel used (1.0% by weight of C at the surface and 0.75% by weight of C at 1 mm depth). The result is shown by a graph in FIG. 7. As can be seen from the graph, if the carbon content is 0.3% by weight or lower, the time required for the carbonitriding treatment is extremely long. In a case of the carbon content of 0.2% by weight, it takes about twice time compared with the case of 0.3% by weight.

Further, if the chromium content in the steel material used is less than 0.7% by weight, the wear resistance is insufficient and, if it exceeds 1.5% by weight, macro carbides tend to be formed which may cause lowering of the rolling fatigue life of the rolling bearing.

Further, since the Vickers hardness (HV) at the raceway surface of the inner ring is 700 or more, the high temperature fatigue life and the wear resistance are satisfactory. It is preferred that the Vickers hardness (HV) at the raceway surface of the inner ring is 720 or more.

The carbon content at the surface layer of the inner ring on the side of the raceway surface (surface carbon concentration on the inner ring raceway surface) is preferably 0.8% by weight or more and 1.3% by weight or less.

If the surface carbon concentration at the inner ring raceway surface is less than 0.8% by weight, the rolling fatigue life at high temperature is insufficient. If the surface carbon concentration at the inner ring raceway surface exceeds 1.3% by weight, macro carbides are formed in the raceway surface to lower the rolling life.

In the third rolling bearing, it is preferred that the outer ring is formed of a steel material containing, as the alloy ingredient, 0.8% by weight or more and 1.2% by weight or less of C, 0.5% by weight or more and 2.5% by weight or less of Si, 0.7% by weight or more and 1.5% by weight or less of Cr, 0.8% by weight or more and 2.0% by weight or less of Mo and 0.3% by weight or more and 1.2% by weight or less of Mn, with a ratio of Mo to Cr (Mo/Cr: weight ratio) of 1.1 or more into a predetermined shape, then applied with hardening and then applied with tempering at a temperature of 240° C. or higher and 350° C. or lower to make the Vickers hardness (HV) at the raceway surface and/or rolling surface to 720 or more. The rolling bearing is referred to as a fourth rolling bearing.

According to the fourth rolling bearing, since the outer ring is formed of the steel material described above, wear resistance at high temperature can be improved with no carburization treatment or carbonitriding treatment. Particularly, formulation balance between Mo carbides and Cr carbides is improved by defining the ratio of Mo to Cr contained in the steel material used as Mo/Cr≧1.1, and fine carbides ($M_{23}C_6$ type) are dispersingly precipitated to obtain satisfactory wear resistance.

In this fourth rolling bearing, the critical meaning for the range of the content of each of the ingredients in the steel material constituting the outer ring is identical with that in the first rolling bearing described above.

Further, hardness capable of enduring high temperature use and wear resistance can be obtained by defining the content for each of the ingredients in the steel material used to the predetermined range, and controlling the tempering temperature to 240° C. or higher and 350° C. or lower and making the Vickers hardness (HV) at the raceway surface to 720 or more.

Therefor, since the fourth rolling bearing comprises an inner ring capable of enduring use under high fitting stress exceeding 130 MPa and an outer ring having a high wear resistance at a high temperature, it is suitable as a rolling bearing to be used under application of a fitting stress to the inner ring relative to the shaft and for use under high temperature and lubrication with intrusion of obstacles. Furthermore, since the outer ring is not applied with carburization treatment or carbonitride treatment, manufacturing cost is reduced.

Further, for suppressing the dimensional change upon long time use at a high temperature, it is preferred that the amount of the residual austenite after tempering is 2.0% by volume or less for the outer ring of the fourth rolling bearing. It is necessary to make the tempering temperature higher in order to decrease the amount of the residual austenite, but the hardness tends to lower as the tempering temperature is higher. Accordingly, the hardness and the dimensional stability are compatibilized by defining the tempering temperature to 240° C. or higher and 350° C. or lower.

Also in the fourth rolling bearing, it is preferred to restrict the amount of the residual austenite after tempering to 2.0% by volume or less for suppressing the dimensional change upon long time use at high temperature.

For solving the third subject, this invention also provides a rolling bearing having an inner ring and an outer ring of the following constitution (fifth rolling bearing). The an inner ring is formed of a steel material containing, as the alloy ingredients, 0.3% by weight or more and 0.7% by weight or less of C, 0.7% by weight or more and 1.5% by weight or less of Cr and 0.8% by weight or more and 2.0% by weight or less of Mo, with a ratio of Mo to Cr (Mo/Cr: weight ratio) of 1.1 or more into a predetermined shape, then applied with a carbonitriding treatment and hardening and tempering to make the Vickers hardness (HV) at the raceway surface of 720 or more, and the absolute value for the compressive residual stress on the raceway surface is 160 MPa or more.

The outer ring of the fifth rolling bearing is identical with outer ring of the fourth rolling bearing.

According to the fifth rolling bearing, since the ratio of Mo to Cr contained is defined as; Mo/Cr≧1.1 not only in the steel material for the outer ring but also for the steel material for the inner ring, the wear resistance of both of the inner ring and the outer ring is improved. Accordingly, it has a longer life under high temperature and lubrication with intrusion of obstacles than the fourth rolling bearing.

Also for the inner ring and the outer ring of the fifth rolling bearing, it is preferred for suppressing dimensional change upon long time use under high temperature to define the amount of the residual austenite after tempering to 2.0% by volume or less.

The present invention also provides a rolling bearing as defined in the third rolling bearing in which the outer ring is formed of a steel material containing, as the alloy ingredient, 0.3% by weight or more and 0.7% by weight or less of C and 0.7% by weight or more and 1.5% by weight or less of Cr into a predetermined shape and then applied with a carbonitriding treatment and hardening and tempering in which the Vickers hardness (HV) at the raceway surface is 700 or more and an absolute value for the compressive residual stress at the raceway surface is 160 MPa or more.

Also for the inner ring and the outer ring in this rolling bearing, it is preferred for suppressing dimensional change upon long time use at high temperature to define the amount of the residual austenite after tempering to 2.0% by volume or less.

BEST MODE FOR PRACTICING THE INVENTION

Now, preferred embodiments of the prevent invention is to be described.

[First Embodiment]

As a first embodiment, a preferred embodiment of a first rolling bearing according to the present invention is to be described.

Using steel materials: Nos. 1-1 to 1-13, test pieces for measurement of Vickers hardness (HV), measurement for the amount of residual austenite, for wear test and for high temperature thrust life test were prepared respectively. The alloy ingredients contained in the steel materials: Nos. 1-1 to 1-13 are shown in the following table 1. Each of the test specimens was prepared as described below.

At first, each of the steel materials was formed to a predetermined shape for each of tests. Then, each of the thus formed products was kept in a quenching gas atmosphere at 820 to 860° C. for 0.5 hour, then hardened in an oil at 60 to 100° C. and then tempered by being kept at each of temperatures shown in Table 1 for 2 hours.

Using each of the thus obtained test specimens, measurement for Vickers hardness, measurement of residual austenite amount, wear test and high temperature thrust bearing test were conducted.

Measurement for Vickers hardness was conducted in accordance with the Vickers hardness test method according to (JIS Z 2244). Measurement for the amount of residual austenite was conducted by X-ray diffractiometry.

Figure 1:
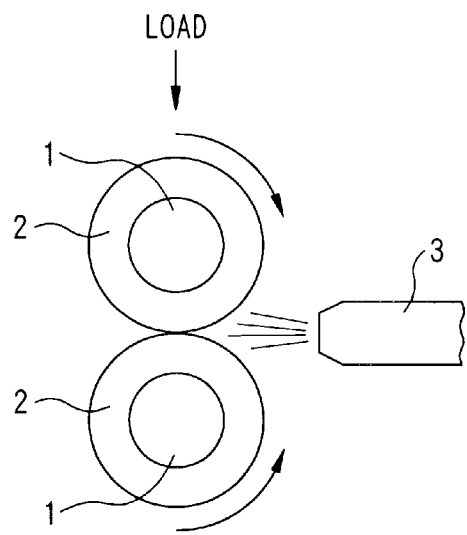
FIG. 1 is an explanatory view of a 2-cylinder type wear test conducted for preferred embodiments in which (a) is a front elevational view and (b) is a side elevational view.
Figure 1:
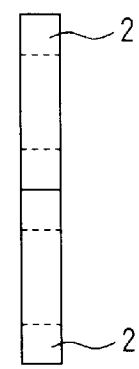

The wear test was conducted by a two cylinder type wear test as shown in FIG. 1. FIG. 1(a) is a front elevational view and (b) is a side elevational view.

At first, a pair of cylindrical test pieces 2 were attached to a pair of vertically opposed rotational shafts 1. Then, a load was applied to the upper test specimen 2 to bring both of the test pieces 2 into contact and, while blowing a lubricant from a nozzle 3 to a contact position, one of the test specimens 2 was rotationally driven at a low speed thereby slidingly-rotating both of the test specimens 2 in a direction opposite to each other. Then, after rotation by a predetermined distance, a wear amount per unit sliding distance (total weight reduction for both of the specimens 2) was measured.

(Test Condition)

Shape of test specimen: cylinder of 30 mm outer diameter, 7 mm thickness.

Surface roughness of test specimen: Ra 0.008–0.01 Mm.

Driving side rotational speed: 10 rpm

Driven side rotational speed: 7 rpm

Sliding ratio: 30%.

Lubricant: spindle oil #10

Surface pressure: 120 kg/mm²

Sliding distance: 3000 m

Test temperature: 20° C.

Figure 2:
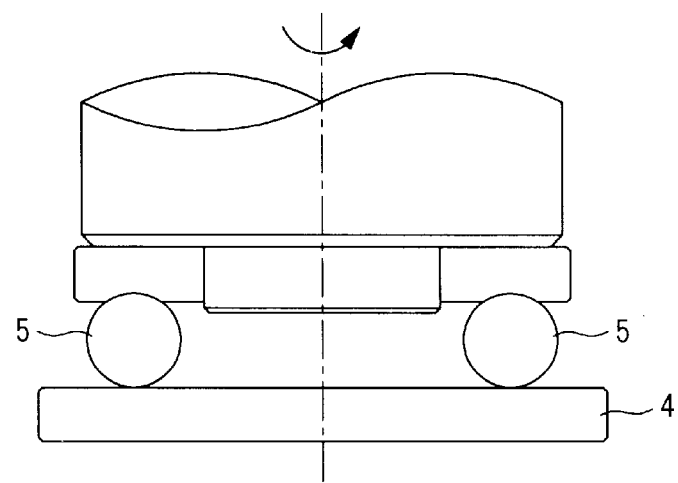
FIG. 2 is an explanatory view of a high temperature thrust life test conducted for preferred embodiments.

As shown in FIG. 2, the high temperature thrust life test was conducted by placing ball-shaped test specimens 5 on a plate-shaped test specimen 4 and rotating the ball-shaped test specimens in a state of loading a thrust weight.

(Test Condition)

Tester: thrust tester as described in [Special Steel Manual (first edition)], pages 10–21 (edited by Denki Seiko Institute, issued from Richogakusha in May 25, 1965).

Shape of test specimen
  Plate: Disk of 60 mm outer diameter and 6 mm thickness
  Ball: ball of (⅜ inch) diameter
Surface Roughness of Test Specimen
  Plate: Ra 0.008 to 0.01 μm
  Ball: Ra 0.006 Mm
Surface Pressure: 5500 MPa
Rotational speed: 1000 rpm
Lubricant: turbine oil # 254
Test temperature: 200° C.
Life judgement: occurrence of flaking
Life value: relative value based on $L_{10}$ life of No. 10 (SUJ 2) as "1".

Table 1 shows results of the measurement and test. In table 1, underlines are attached to those numerical values out of the scope of the present invention.

As can be seen from the result in Table 1, No. 1-1 to No. 1-4 and No. 1-11 to 1-13 having the alloy ingredient and the Vickers hardness within the range of the present invention had twice or more of high temperature thrust life compared with No. 1-10 (SUJ 2). On the contrary, No. 1-5 to No. 1-9 having the alloy ingredient and the Vickers hardness out of the range of the present invention had high temperature thrust life of about 1.4 to 1.6 times No. 1-10 (SUJ 2).

Further, while No. 1-5 to No. 1-9 having the alloy ingredient and the Vickers hardness out of the range of the present invention had a wear amount per unit sliding distance as large as 0.0050 to 0.0085 g/m, No. 1-1 to No. 1-4 and No. 1-11 to 1-13 having the alloy ingredient and the Vickers hardness within the range of the present invention had the wear amount as less as 0.0010 to 0.0030 g/m.

Figure 3:
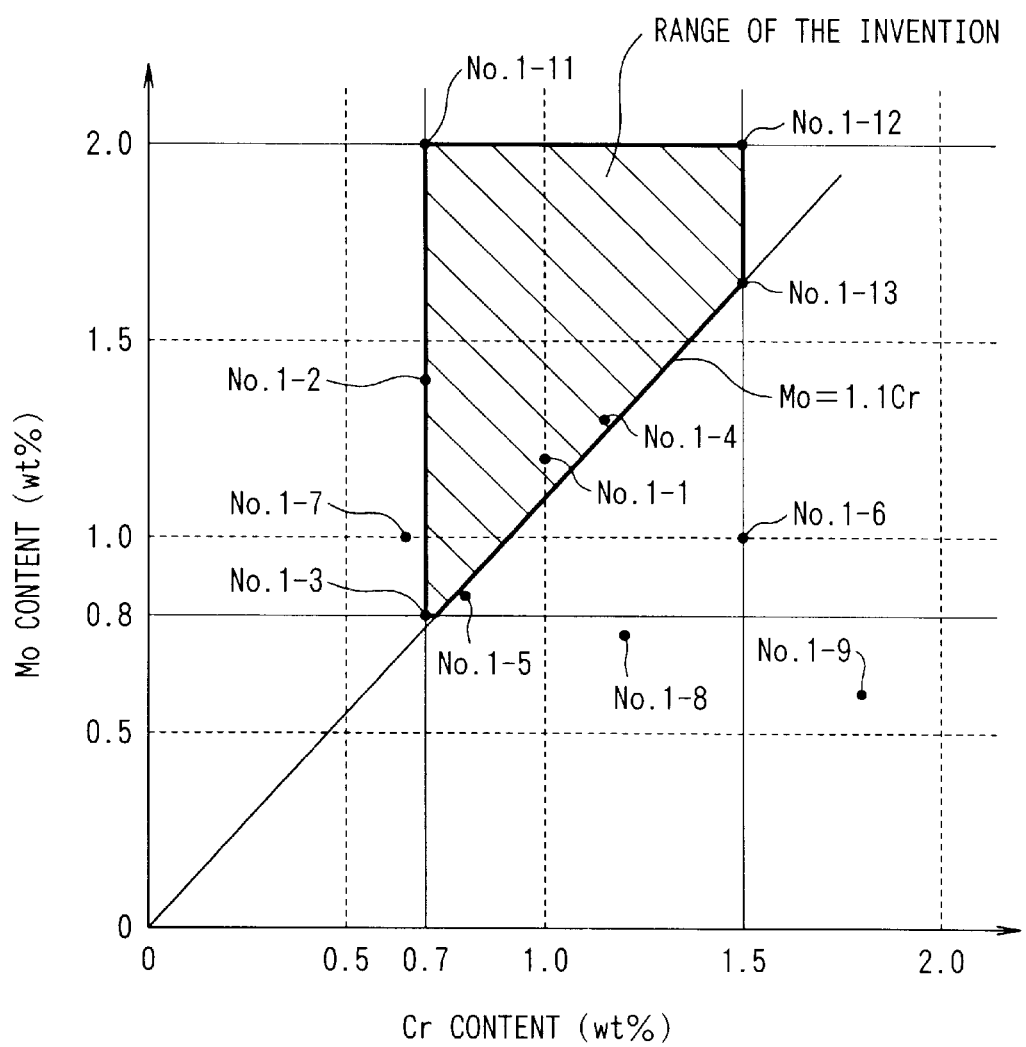
FIG. 3 is a graph illustrating a relation between MO content and Cr content in steel materials used in each of test specimens of preferred embodiments.

FIG. 3 is a graph illustrating a relation between Mo content and Cr content of steel materials used for each of the test specimens. A hatched area in the graph shows the range of the present invention (range satisfying all of Cr: 0.7 wt % or more and 1.5 wt % or less, Mo: 0.8 wt % or more and 2.0 wt % or less, (Mo/Cr)≧−1.1). Nos. 1 to 4 and Nos. 1-11 to 1-13 within the range described above have a high temperature thrust life twice or more of No. 1-10 (SUJ 2), whereas No. 1-5 to No. 1-9 out of the range have a life of less than twice.

Accordingly, the bearings of the present invention served for high temperature application use exceeding 200° C. have wear resistance at room temperature and also long life even at a high temperature as shown in Table 1 by the effect of $M_{23}C_6$ type fine carbides precipitated dispersingly on the raceway surface and/or rolling surface by defining as (Mo/Cr)≧1.1, in addition to the anti-temperability of Cr and Mo.

Then, using steel materials of Nos. 1-1 to 1-13, inner rings, outer rings and rolling elements for rolling bearings of bearing No. 6202 were manufactured under the same conditions as those for each of the test specimens described above. When the rolling bearings were put to a life tester and the rolling fatigue life was measured under the rolling conditions, substantially the same result as that for the high temperature thrust life described above could be obtained.

Surface pressure: 300 MPa
Rotational speed: 3000 rpm
Lubricant: turbine oil # 254
Test temperature: 200° C.
Life judgement: occurrence of flaking
Life value: relative value based on $L_{10}$ life of No. 10 (SUJ 2) as "1".

In Nos. 5, 6 and 9, since the amount of residual austenite was more than 2.0% by volume, the dimensional stability was poor.

From the foregoings, it can be seen that the wear resistance at high temperature is improved and rolling fatigue life at high temperature is extended by defining the alloy ingredients and the Vickers hardness within the range of the present invention. Further, since there is no requirement for carburizing treatment or carbonitriding treatment and there is also no requirement of adding a great amount of a particularly expensive elements as the alloy ingredients, the production cost can be kept lower.

In this embodiment, both of the inner ring and the outer ring have a constitution satisfying the conditions of the present invention but the rolling bearing of the present invention can provide more preferred performance than existent rolling bearing even the constitution satisfies the conditions of the present invention only for the inner ring.

(Second Embodiment)

As a second embodiment, a preferred embodiment of a second rolling bearing according to the present invention to be described.

Figure 4:
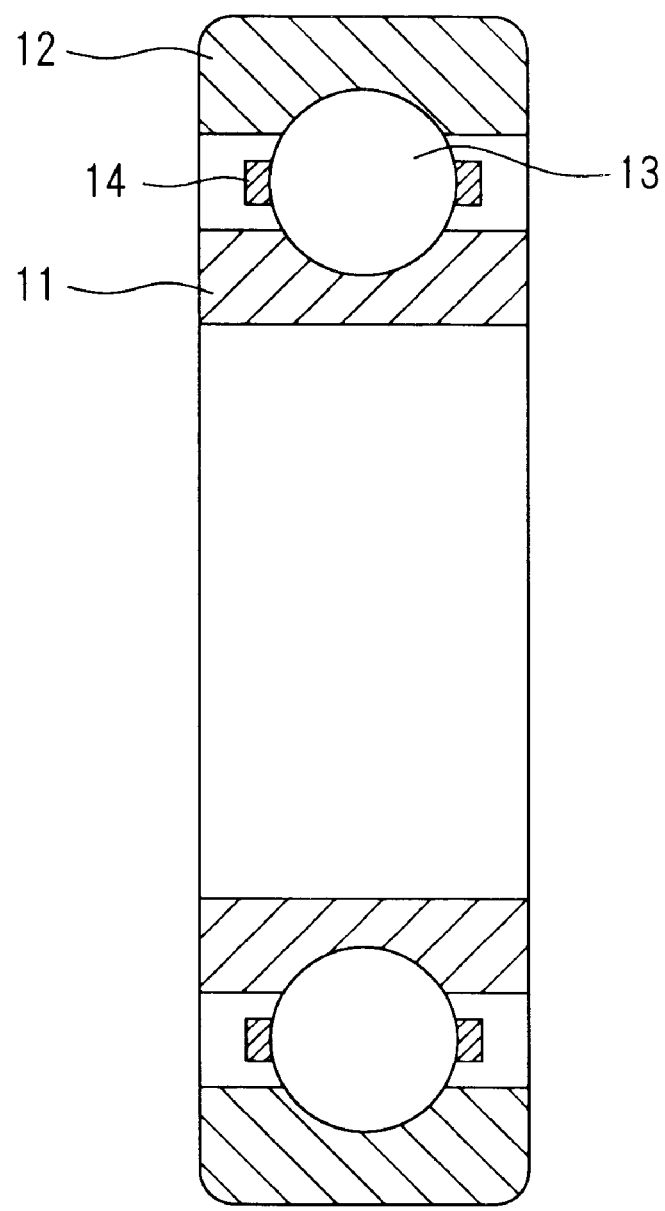
FIG. 4 is a cross sectional view illustrating a rolling bearing corresponding to a preferred embodiment according to the present invention.

FIG. 4 is a cross sectional view illustrating a rolling bearing corresponding to a preferred embodiment according to the present invention. The rolling bearing is a ball bearing comprising an inner ring 11, an outer ring 12, balls (rolling element 13) and a cage 14. In this embodiment, ball bearings of JIS bearing number 695 were prepared while varying the materials and heat treatment conditions for the inner ring 11, the outer ring 12 and the ball 13.

For the inner ring 11 and the outer ring 12, the steel materials shown in Table 2 (steel species Nos. A1 to A12 and B1 to B7) were formed each into a predetermined shape and then applied with hardening and tempering under each of the conditions. Sub zero treatment was also applied for a portion of them.

In Table 2, underlines are attached to numerical values out of the range of the present invention. The steel species Nos. A1 to A12 are steel materials having the content for each of the alloy ingredients and the ratio (Mo/Cr) at the position for 2% Da depth (all) within the range of the present invention. The steel species B1 to B7 are steel materials having any of the content of each of the alloy ingredients and/or the ratio (Mo/Cr) at the position for 2% Da depth are out of the range of the present invention. The steel species No. B7 is SUJ 2.

For the ball (rolling element) 13, balls made of SUJ 2 usually used for ball bearings of JIS bearing No. 695 manufactured by NSK Ltd. (surface hardness HV780) or those comprising the materials shown in Table 3 were used. Nitriding treatment is applied to the balls made of S1, S2 and S3 in Table 3.

The inner ring, the outer ring and the balls (rolling elements) were combined as shown in Tables 4 and 5 to prepare rolling bearings of samples Nos. 2-1 to 2-31. In each of the samples, all of the inner rings and the outer rings used were made of the same material and under the identical conditions. All of the rolling elements used were subjected to lap fabrication to the grade 3 or higher. As the cage, cages made of plastic materials were used, as the lubricant, a rust preventive oil and mineral type grease were used.

For the inner ring and the outer ring, the amount of residual austenite (% by volume): $\gamma_R$ at the position from the raceway surface to the core portion by a size corresponding to 2% of the diameter of the ball (position for 2% Da depth) and the Vickers hardness: HV at the position for 2% Da depth were measured.

For the Vickers hardness (HV) at the position for 2% Da depth, the surface of the groove was ground to expose the cross sectional position at 2% Da depth and the Vickers hardness at the exposed surface was measured directly under a test load of 500 g. The amount of the residual austenite was measured by X-ray diffractiometry. The results are also shown together in Tables 4 and 5. In the tables, underlines are attached to numerical values out of the range of the present invention. The Mo to Cr ratio (Mo/Cr: weight ratio) at the position for 2% Da depth is calculated based on the Cr content and the Mo content of the steel materials used and shown in Table 2.

For the bearings of each of the samples, the impact resistance was examined by the following method.

At first, an axial vibration acceleration (G value) when 1.2 kgf of a prepressure was applied in an axial direction, to the bearing of each sample and rotated at a rotational speed of 1800 rpm was measured as an initial value. Then, 1.2 kgf of an axial load was added and the bearing was rotated under the same condition to measure the G value. Then, the axial load was set to kgf and, subsequently, a procedure of measuring the G value while rotation under the same condition by increasing the axial load each by 0.5 kgf was repeated. The axial load was defined as an impact load value when the measured value for G value was increased by 20 mG from the initial value.

Then, relative values were calculated for the compact load value of each sample based on the impact resistance load value of sample No. 2-27 (sample in which both of inner and outer rings and rolling elements were made of SUJ 2 and heat treatment was applied to the inner and outer rings such that the residual austenite at the position for 2% Da is 0) as the standard ("1.00"), and the relative impact resistance (indentation resistance) for each sample was evaluated in accordance with the relative value. The larger value means higher impact resistance (indentation resistance). The values are also shown in Table 4 and Table 5.

Figure 5:
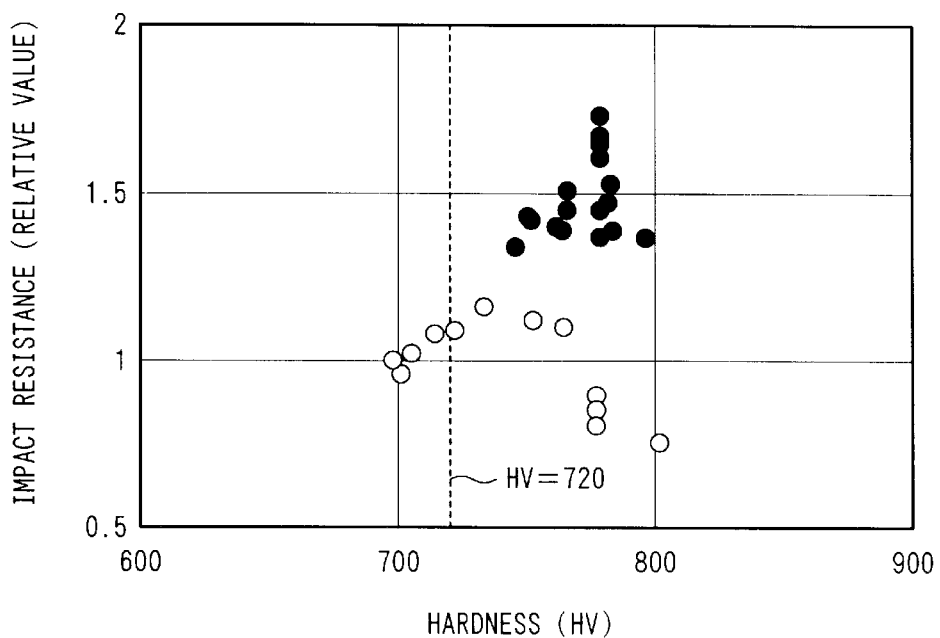
FIG. 5 is a graph illustrating a relation between a hardness (HV) and an impact resistance (relative value) at a position for 2% Da depth obtained from the test result for preferred embodiments.
Figure 6:
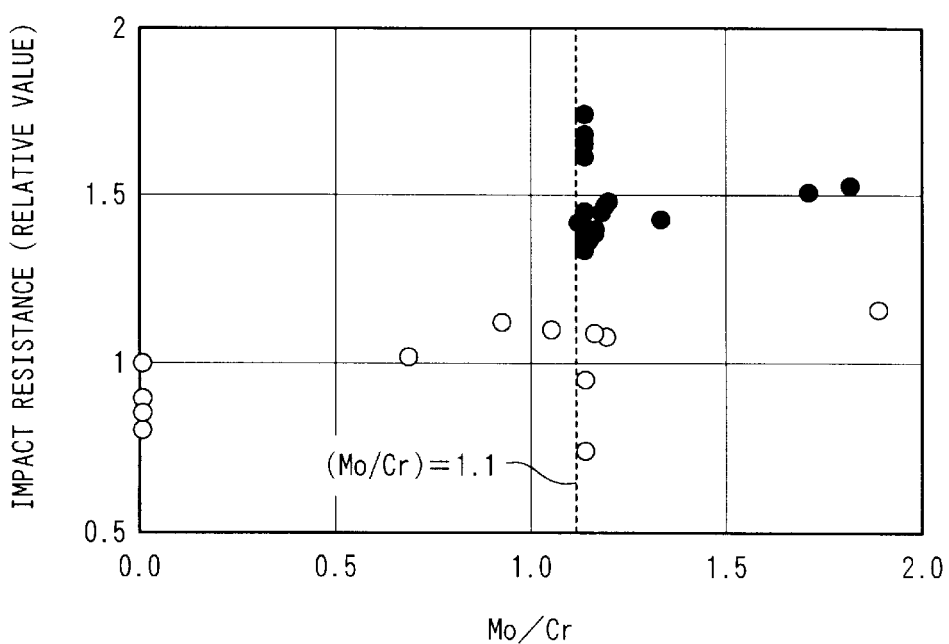
FIG. 6 is a graph illustrating a relation between a Mo to Cr ratio (Mo/Cr) and an impact resistance (relative value) at a position for 2% Da depth obtained from the test result for embodiments.
Figure 7:
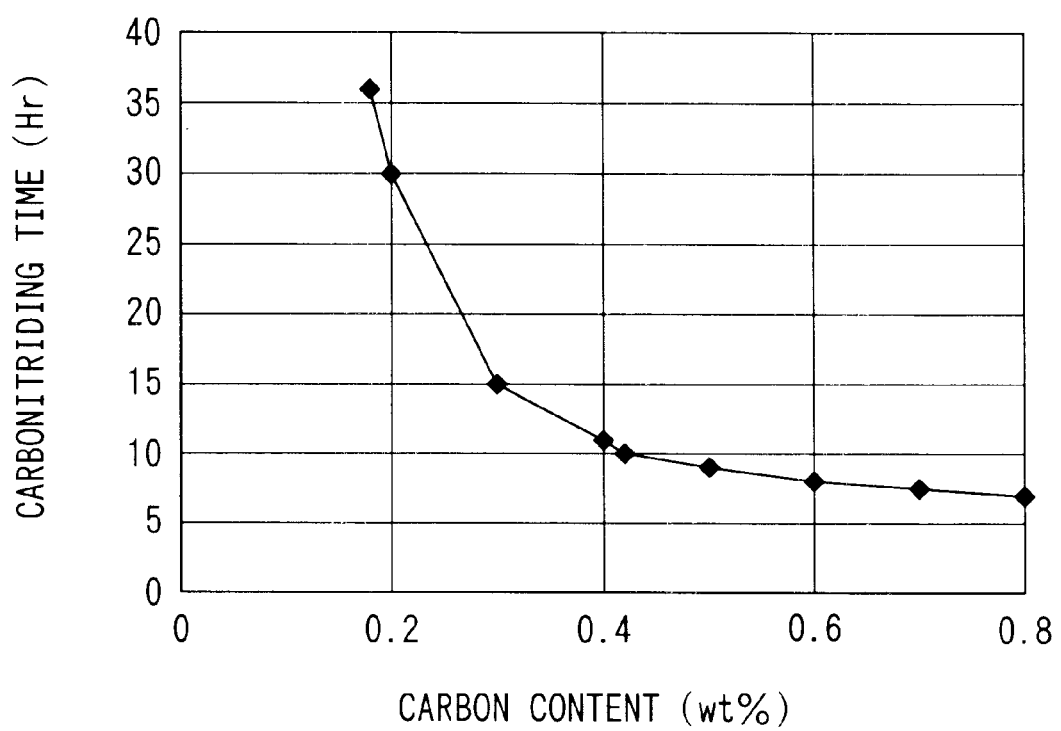
FIG. 7 is a graph illustrating a relation between a carbon content and a carbonitriding time for steel alloy used.

FIG. 5 shows, by the graph, a relation between the hardness (HV) at the position for 2% Da depth and the impact resistance (relative value) and FIG. 6 shows a relation between Mo to Cr ratio (Mo/Cr) at the position for 2% Da and the impact resistance (relative value) respectively.

As can be seen from the results, bearings of samples Nos. 2-1 to 2-18 satisfying all the conditions of the present invention are superior in the impact resistance compared with the bearings of samples Nos. 2-19 to 2-31 not satisfying any of the conditions of the present invention.

While the inner and outer rings of Nos. 2-19 and 2-20 are formed of the steel material within the range of the present invention, since the inner and outer rings of No. 2-19 had a large amount of residual austenite at the position for the 2% Da depth as large as 10.5% by volume and the inner and the outer rings of No. 2-20 had hardness HV at the position for 2% Da as small as HV 701, they were inferior in the impact resistance compared with the standard No. 2-27.

While the inner and outer rings of Nos. 2-21 to 2-23 had the Mo to Cr ratio (Mo/Cr) at the position for 2% Da depth of 1.1 or more, since any one of the contents of the alloy ingredients in the steel materials used was out of the range of the present invention, no sufficient impact resistance could be obtained. That is, No. 2-21 could not provide a sufficient hardness since the content of carbon in the steel material used was lower. While Nos. 2-22 and 2-23 had a hardness of 720 or more at the position for 2% Da depth, since the content of silicon or chromium in the steel material used was lower, the impact resistance was insufficient.

Since the inner and outer rings of Nos. 2-24 to 2-31 had Mo to Cr ratio (Mo/Cr) at the position for 2% Da depth of less than 1.1, no sufficient resistance could be obtained.

On the other hand, in the comparison within Nos. 2-1 to 2-18, bearings of 2-15 to 2-18 using rolling elements (balls)

made of material other than SUJ 2 are particularly excellent in the impact resistance (indentation resistance). This is because the inner rings and the outer rings satisfy all the conditions of the present invention and the difference between the hardness of the ball (HV 1320-1470) and the hardness at the position for 2% Da depth of the inner and outer rings (HV 778) is as large as 300 or more. Further, since the bearings Nos. 2-15 to 2-17 had a difference between the surface hardness of the ball and the hardness at the position for 2% Da of the inner and outer rings of 500 or more, they are more excellent in the impact resistance.

However, even in a case where the difference between the hardness of the ball and the hardness of the raceway surface of the inner and outer rings is as large as 300 or more Hv, if the inner ring and the outer ring do not satisfy all the conditions of the present invention, the impact resistance (indentation resistance) is worsened as in the bearings Nos. 2-28 to 2-31.

In this embodiment, both of the inner ring and the outer ring have the constitution satisfying the conditions of the resent invention but the rolling bearing of the present invention can provide more preferred impact resistance (indentation resistance) than existent rolling bearings even when the constitution satisfies the conditions of the present invention only in the inner ring.

(Third Embodiment)

As a third embodiment, preferred embodiments of third to fifth rolling bearings according to this invention are to be described.

(Samples No. 3-1 to 3-11)

Bearing inner rings were prepared with alloy steels No. 10, and Nos. 14 to 23 shown in Table 6. In the table, underlines are attached to numerical value out of the range of the invention (the alloy ingredient composition of the steel material for the inner ring of the third rolling bearing).

At first, each of the alloy steels was molded into the shape of an inner ring, and a half elliptic crack K was formed to a central portion of the raceway surface of the shaped product. Then, samples No. 3-1 to No. 3-9 were carbonitrided in a mixed gas atmosphere of an RX gas and an ammonia gas at a temperature of 900 to 950° C., applied with hardening of keeping in an RX gas atmosphere at 820 to 860° C. and then quenching and, subsequently, tempered at each temperature shown in Table 7.

Sample No. 3-10 was carburized in an RX gas atmosphere at a temperature of 900 to 950° C., applied with hardening of keeping in the RX gas atmosphere at 820 to 860° C. and quenching and then tempered at 270° C. Sample No. 3-11 was applied with hardening of keeping at 820 to 860° C. and then hardening and, subsequently, tempered at 270° C.

An inner ring with a tapered inner diameter was prepared by applying finish grinding to the shaping product after the heat treatment. The heating keeping time upon hardening was 40 min and the heating keeping time upon tempering was 120 min.

Figure 8:
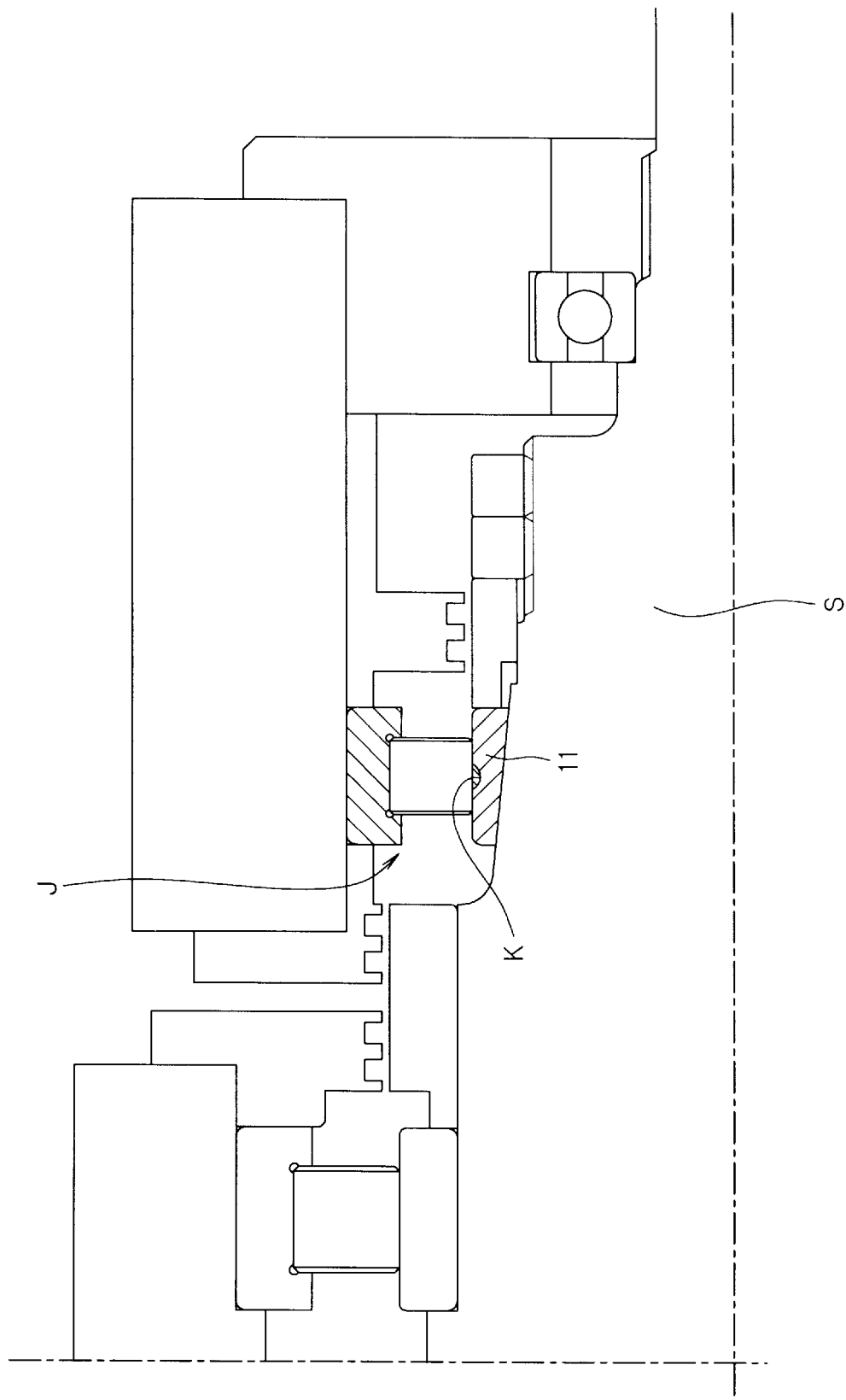
FIG. 8 is a schematic view illustrating an inner ring fracture life test apparatus used for preferred embodiments.

As shown in FIG. 8, a cylindrical roller bearing J including the inner ring 11 was put to a test apparatus, to conduct inner ring crack fracture life test. That is, the inner ring 11 was pressed into a tapered shaft S, a fitting stress of 200 MPa was applied to the inner ring 11 and the tapered shaft s was rotated under the condition at a radial load of 38000 N and the number of rotation of 1800 rpm. Thus, rolling stress was applied to the raceway surface of the inner ring 11 to develop the crack K and the total number of rotation till the inner ring 11 was cracked in the axial direction was examined.

On the other hand, before the inner ring crack fracture life test, the carbon content at the surface layer (surface carbon concentration) on the side of the raceway surface of the inner ring 11 and the compressive residual stress at the raceway surface of the inner ring 11 after the heat treatment were measured.

Further, specimens for the measurement of the Vickers hardness (HV), for the measurement of the amount of the residual austenite, and for the wear test were prepared respectively by conducting each of the identical heat treatments as described above by using each of the alloy steels.

Measurement for the Vickers hardness was conducted in accordance with the Vickers hardness test method of "JIS Z 2244". Measurement for the amount of residual austenite was conducted by X-ray diffractiometry. Wear test was conducted by the same method as that for the first embodiment and indicated as pass "○" for the wear amount of 0.010 g/mm or less, as failure "x" for the wear amount exceeding 0.010 g/m, and, further, as particularly excellent "⊚" for the wear amount of 0.003 g/m or less.

Furthermore, the raceway surface of the inner ring after the heat treatment was observed by an electron microscope to examine whether macro carbides were formed or not on the raceway surface.

Each of the conditions and the test results described above is shown in Table 7. As can be seen from Table 7, since the inner rings of the samples Nos. 3-3 to 3-8 satisfy the range of the present invention, that is, all of the contents for carbon and chromium in the alloy steels used ($0.3 \leq C \leq 0.7$, $0.7 \leq Cr \leq 1.5$), the Vickers hardness at the raceway surface (HV 700 or more) and the absolute value of the compressive residual stress (160 MPa or more), the inner ring cracking fracture life was as high as $100 \times 10^6$ rev (revolution) or higher and the inner ring cracking fracture was less caused. Further, the wear resistance was also high and no macro carbides were formed on the raceway surface.

Particularly, in the inner rings of the samples Nos. 3-5 and 3-7, since the alloy steels used (steel Nos. 18, 20) can satisfy each of the contents for carbon, silicon, chromium, molybdenum and manganese and $Mo/Cr \geq 1.1$ corresponding to the inner ring of the fifth rolling bearing, the wear resistance was particularly high.

On the contrary, in the inner rings of the samples Nos. 3-9 to 3-11, since the alloy steels used had the carbon content of 0.7% by weight or higher, the absolute value of the compressive residual stress was 160 MPa or less. As a result, the inner ring crack fracture life was low. Particularly, in the samples Nos. 3-0 and 3-11, flaking was observed on the inner ring raceway surface.

Among them, in the sample No. 3-10, macro carbides were precipitated on the raceway surface under the observation by an electron microscope and flaking was caused therefrom as the initiation points. This is attributable to that the surface carbon concentration is high as 1.4% by weight. Flaking was caused in the inner ring raceway surface of the sample No. 3-11, because the surface hardness was as low as HV 630 by applying high temperature tempering (of such an extent as reducing the amount of the residual austenite to 0) without carbonitriding treatment.

In the samples Nos. 3-1 and 3-2, since the carbon content of the alloy steel used was 0.3% by weight or less taking much time for the carbonitriding treatment, the heat treatment cost is increased. Further, in the samples Nos. 3-2 and 3-9, since the chromium content of the alloy steels used was 0.7% by weight or less, the wear resistance was poor.

(Samples No. 3-12 to No. 3-20)

Inner rings used for the crack fracture life test of the inner rings as described above were prepared in the same manner as described above by using alloy steels Nos. 10, 17 and 20 shown in Table 6. However, the tempering temperature was changed as shown in Table 8. Further, under the same conditions, test pieces for the high temperature thrust test were prepared. The high temperature thrust test was conducted in the same method as for the first embodiment, and relative values were calculated based on the value "1" for the high temperature thrust life of the sample No. 3-20 using the alloy steel No. 10.

A test of examining the dimensional stability by using the inner ring 11 for the crack fracture life test of the inner ring was conducted by the following method. At first, the size of the outer diameter of the inner ring 11 is measured before the test. Then, after keeping the inner ring 11 at 150° C. for 2500 hours, the size for the outer diameter of the inner ring 11 is measured again. A size changing coefficient (%) is defined as a value obtained by dividing the difference ΔD between both of the measuring values by a size D before the test and expressing the value by percentage. When the size changing the variation coefficient is within ±0.010%, it can be judged that the practical dimensional stability is satisfactory.

Further, the test pieces for the measurement of the Vickers hardness (HV) and for the measurement of the amount of residual austenite were prepared respectively by applying identical heat treatment on the samples of each number respectively, and the Vickers hardness (HV) and the amount of residual austenite (y) were measured.

Each of the conditions and the test results are shown in Table 8. As can be seen from Table 8, samples Nos. 3-14, 3-15 and 3-18 to 3-20 having the amount of residual austenite of 2.0% by volume (v%) or less had preferred practical dimensional stability. Further, the samples Nos. 3-12 to 3-19 had a surface hardness of HV 700 or more, and provided a high temperature thrust life 1.8 times as large as the sample No. 3-20 having the surface hardness as low as HV 640.

(Sample No. 3-21 to No. 3-30)

Outer rings and inner rings of self aligned roller bearings of bearing No. 22211 were prepared in accordance with the constitution in Table 9.

The outer rings were prepared by using alloy steels Nos. 1 to 9 and 20 shown in Table 10 and under the heat treatment conditions shown in Table 9. In table 10, underlines are attached to numerical value out of the range of the present invention (alloy ingredient composition for the steel materials for the outer rings of the fourth rolling bearing). The inner rings were prepared by using alloy steels Nos. 17 and 20 shown in Table 6 and under the heat treatment conditions shown in Table 11. Rolls made of SUJ 2 were prepared as the rolling elements.

Further, test pieces for the measurement of the Vickers hardness and for the measurement of residual austenite amount by conducting identical heat treatment on the samples of each number, and the Vickers hardness (Hv) and the amount of the residual austenite ($\gamma_R$) were measured.

Self aligned roller bearings of bearing No. 22211 were assembled by using the inner rings, the outer rings and the rolling elements, and the life test was conducted under the following conditions at a high temperature and under lubrication within intrusion of obstacles.

Obstacles intruded: stainless steel powder of 74 to 147 μm.

Amount of obstacles intruded: 300 ppm.

Lubricant: "Nisseki R068" (corresponding to ISO-VG 68)

Load condition: radial load=30000 V, axial load=7500 V (P/C=0.43).

Number of rotation of bearing: 1500 rpm.

Test temperature: 130° C.

A life test was conducted on every 20 bearings for the samples of each number, and the total rotation time ($L_{10}$ life) till the occurrence of flaking in 10% of bearings from the side of the shorter life was determined by the Weibull distribution function. Further, it was examined as to whether flaking occurred in the outer rings or the inner rings, and the ratio for the number of flaking in the outer ring to the number of total flaking (outer ring fracture ratio) was calculated on every bearings of each sample number.

Each of the conditions described above and the test results are shown in Table 9. In the comparison within the samples Nos. 3-21 to 3-28, the samples Nos. 3-21 to 3-23 having the composition for the steel material of the outer ring within the range of the fourth bearing had longer life under high temperature and lubrication with intrusion of obstacles than the samples Nos. 3-24 to 3-28 out of the range described above. Further, in the samples Nos. 3-21 to 3-23, flaking occurred more in the inner rings than in the outer rings. In the samples Nos. 3-24 to 3-28, flaking occurred more in the outer rings than in the inner rings.

The sample No. 3-29 could provide satisfactory life equal with that in the samples Nos. 3-21 to 3-23 but, since this was obtained by applying a carbonitriding treatment to both inner and outer rings. However, since this was obtained by applying the carbonitriding treatment to both inner and outer rings, it required higher heat treatment cost than for the samples Nos. 3-21 to 3-28 in which the carbonitriding treatment was not applied to the outer rings.

Since the composition of the steel material for the inner rings is within the range of the fifth rolling bearing, the sample number 3-30 had a longer life under high temperature and lubrication with intrusion of obstacles than the samples Nos. 3-21 to 3-23 and No. 3-29. Since the wear resistance was substantially identical between the inner ring and outer ring, there was no distinct difference in the number of flaking occurred between the inner rings and the outer rings. Further, since the carbonitriding treatment was not applied to the outer ring, it required lower heat treatment cost than that for the sample No. 3-29.

TABLE 1

| No. | Alloy ingredient (wt %) | | | | | Mo/Cr | Tempering temperature (° C.) | Hardness (HV) | $\gamma_R$ (vol %) | Wear amount (g/m) | High temperature thrust life |
|---|---|---|---|---|---|---|---|---|---|---|---|
| | C | Si | Mn | Cr | MO | | | | | | |
| 1-1 | 1.00 | 1.00 | 0.30 | 1.00 | 1.20 | 1.20 | 350 | 735 | 0.5 | 0.0014 | 2.5 |
| 1-2 | 0.80 | 1.50 | 0.50 | 0.70 | 1.40 | 2.00 | 300 | 720 | 0.5 | 0.0030 | 2.3 |
| 1-3 | 0.95 | 2.00 | 0.40 | 0.70 | 0.80 | 1.14 | 350 | 730 | 2.0 | 0.0013 | 2.1 |
| 1-4 | 1.05 | 0.50 | 0.40 | 1.15 | 1.30 | 1.13 | 240 | 725 | 1.0 | 0.0013 | 2.2 |
| 1-5 | 0.75 | 1.20 | 0.40 | 0.80 | 0.85 | 1.06 | 240 | 700 | 4.0 | 0.0055 | 1.4 |
| 1-6 | 1.10 | 0.40 | 0.70 | 1.50 | 1.00 | 0.67 | 270 | 705 | 3.0 | 0.0050 | 1.6 |
| 1-7 | 0.85 | 1.00 | 0.60 | 0.65 | 1.00 | 1.54 | 300 | 690 | 2.0 | 0.0060 | 1.5 |
| 1-8 | 1.00 | 0.50 | 0.50 | 1.20 | 0.75 | 0.63 | 300 | 695 | 2.0 | 0.0050 | 1.4 |
| 1-9 | 0.90 | 2.00 | 0.40 | 1.80 | 0.60 | 0.33 | 350 | 705 | 6.0 | 0.0055 | 1.6 |
| 1-10 | 1.00 | 0.25 | 0.30 | 1.45 | — | — | 240 | 660 | 0 | 0.0085 | 1 |
| 1-11 | 0.90 | 0.80 | 0.80 | 0.70 | 2.00 | 2.86 | 270 | 740 | 2.0 | 0.0010 | 2.1 |
| 1-12 | 1.00 | 1.20 | 1.20 | 1.50 | 2.00 | 1.33 | 330 | 730 | 1.0 | 0.0013 | 2.4 |
| 1-13 | 1.00 | 1.00 | 1.00 | 1.50 | 1.65 | 1.10 | 320 | 735 | 1.0 | 0.0015 | 2.2 |

TABLE 2

| Steel species No. | Alloy ingredient (wt %) | | | | | Mo/Cr |
|---|---|---|---|---|---|---|
| | C | Si | Mn | Cr | Mo | |
| A1 | 1.01 | 1.00 | 0.32 | 1.09 | 1.24 | 1/14 |
| A2 | 1.00 | 1.01 | 0.33 | 0.75 | 1.28 | 1.71 |
| A3 | 0.99 | 0.99 | 0.32 | 0.75 | 1.00 | 1.33 |
| A4 | 1.01 | 0.98 | 0.34 | 1.47 | 1.65 | 1.12 |
| A5 | 1.00 | 1.02 | 0.36 | 0.73 | 0.84 | 1.15 |
| A6 | 1.01 | 1.00 | 0.35 | 1.07 | 1.94 | 1.81 |
| A7 | 1.00 | 1.01 | 0.34 | 1.63 | 1.94 | 1.19 |
| A8 | 0.83 | 1.02 | 0.35 | 1.03 | 1.20 | 1.17 |
| A9 | 1.18 | 0.98 | 0.37 | 1.01 | 1.21 | 1.20 |
| A10 | 1.00 | 0.54 | 0.38 | 1.05 | 1.24 | 1.18 |
| A11 | 1.01 | 2.15 | 0.36 | 1.04 | 1.21 | 1.16 |
| A12 | 0.99 | 0.99 | 1.16 | 1.08 | 1.24 | 1.15 |
| B1 | 0.72 | 1.01 | 0.35 | 1.05 | 1.25 | 1.19 |
| B2 | 1.03 | 0.40 | 0.34 | 1.06 | 1.23 | 1.16 |
| B3 | 1.00 | 0.94 | 0.36 | 0.61 | 1.15 | 1.89 |
| B4 | 0.98 | 0.95 | 0.37 | 1.05 | 0.72 | 0.69 |
| B5 | 0.98 | 0.95 | 0.37 | 1.05 | 1.10 | 1.05 |
| B6 | 1.00 | 0.98 | 0.34 | 1.01 | 0.93 | 0.92 |
| B7 | 1.00 | 0.25 | 0.31 | 1.45 | 0.01 | 0.01 |

TABLE 3

| | Main ingredient content (wt %) | | | |
|---|---|---|---|---|
| | C | Cr | N | C + N |
| SUJ2 | 1.00 | 1.50 | — | 1.00 |
| $Si_3N_4$ | — | — | — | — |
| S1 | 0.45 | 13.01 | 0.14 | 0.59 |
| S2 | 0.39 | 15.98 | 0.09 | 0.48 |
| S3 | 1.03 | 17.32 | — | 1.03 |

TABLE 4

| No. | Inner/outer ring | | | | Rolling element | | Impact resistance |
|---|---|---|---|---|---|---|---|
| | Steel species | Sub-zero treatment | $\gamma_R$ (vol %) | Hardness (HV) | Material | Hardness (HV) | |
| 2-1 | A1 | Applied | 0 | 778 | SUJ2 | 780 | 1.45 |
| 2-2 | A1 | Applied | 0.5 | 796 | SUJ2 | 780 | 1.37 |

TABLE 4-continued

| No. | Inner/outer ring | | | | Rolling element | | Impact resistance |
|---|---|---|---|---|---|---|---|
| | Steel species | Sub-zero treatment | $\gamma_R$ (vol %) | Hardness (HV) | Material | Hardness (HV) | |
| 2-3 | A1 | Non | 0 | 745 | SUJ2 | 780 | 1.34 |
| 2-4 | A2 | Applied | 0 | 765 | SUJ2 | 780 | 1.51 |
| 2-5 | A3 | Applied | 0 | 750 | SUJ2 | 780 | 1.43 |
| 2-6 | A4 | Applied | 0 | 751 | SUJ2 | 780 | 1.42 |
| 2-7 | A5 | Applied | 0 | 763 | SUJ2 | 780 | 1.39 |
| 2-8 | A6 | Applied | 0 | 782 | SUJ2 | 780 | 1.53 |
| 2-9 | A7 | Applied | 0 | 781 | SUJ2 | 780 | 1.47 |
| 2-10 | A8 | Applied | 0 | 765 | SUJ2 | 780 | 1.40 |
| 2-11 | A9 | Applied | 0 | 781 | SUJ2 | 780 | 1.48 |
| 2-12 | A10 | Applied | 0 | 765 | SUJ2 | 780 | 1.45 |
| 2-13 | A11 | Applied | 0 | 783 | SUJ2 | 780 | 1.39 |
| 2-14 | A12 | Applied | 0 | 778 | SUJ2 | 780 | 1.37 |
| 2-15 | A1 | Applied | 0 | 778 | $Si_3N_4$ | 1470 | 1.65 |
| 2-16 | A1 | Applied | 0 | 778 | S1 | 1320 | 1.73 |
| 2-17 | A1 | Applied | 0 | 778 | S2 | 1350 | 1.67 |
| 2-18 | A1 | Applied | 0 | 778 | S3 | 1265 | 1.61 |

TABLE 5

| No. | Inner/outer ring | | | | Rolling element | | Impact resistance |
|---|---|---|---|---|---|---|---|
| | Steel species | Sub-zero treatment | $\gamma_R$ (vol %) | Hardness (HV) | Material | Hardness (HV) | |
| 2-19 | A1 | Applied | 10.5 | 802 | SUJ2 | 780 | 0.76 |
| 2-20 | A1 | Applied | 0 | 701 | SUJ2 | 780 | 0.96 |
| 2-21 | B1 | Applied | 0 | 715 | SUJ2 | 780 | 1.08 |
| 2-22 | B2 | Applied | 0 | 723 | SUJ2 | 780 | 1.09 |
| 2-23 | B3 | Applied | 0 | 734 | SUJ2 | 780 | 1.16 |
| 2-24 | B4 | Applied | 0 | 705 | SUJ2 | 780 | 1.02 |
| 2-25 | B5 | Applied | 0 | 765 | SUJ2 | 780 | 1.10 |
| 2-26 | B6 | Applied | 0 | 753 | SUJ2 | 780 | 1.12 |
| 2-27 | B7 | Applied | 0 | 698 | SUJ2 | 780 | 1 |
| 2-28 | B7 | Applied | 0 | 778 | $Si_3N_4$ | 1470 | 0.86 |
| 2-29 | B7 | Applied | 0 | 778 | S1 | 1320 | 0.90 |
| 2-30 | B7 | Applied | 0 | 778 | S2 | 1350 | 0.86 |
| 2-31 | B7 | Applied | 0 | 778 | S3 | 1265 | 0.81 |

TABLE 6

| Steel species No. | Alloy ingredient (wt %) | | | | | |
|---|---|---|---|---|---|---|
| | C | Si | Mn | Cr | Mo | Mo/Cr |
| 10 | 1.00 | 0.25 | 0.30 | 1.45 | — | — |
| 14 | 0.20 | 0.25 | 0.40 | 1.00 | 0.20 | 0.20 |
| 15 | 0.18 | 0.50 | 0.30 | 0.60 | — | — |
| 16 | 0.30 | 0.50 | 0.75 | 0.70 | 0.30 | 0.43 |
| 17 | 0.40 | 0.40 | 1.10 | 1.20 | 0.05 | 0.04 |
| 18 | 0.42 | 0.80 | 0.60 | 0.70 | 0.80 | 1.14 |
| 19 | 0.50 | 0.40 | 1.00 | 1.00 | 0.80 | 0.80 |
| 20 | 0.60 | 1.00 | 0.40 | 1.09 | 1.20 | 1.10 |
| 21 | 0.70 | 0.20 | 0.75 | 1.50 | — | — |
| 22 | 0.80 | 0.25 | 0.75 | 0.60 | — | — |
| 23 | 1.10 | 0.25 | 0.80 | 1.50 | — | — |

TABLE 7

| No. | Steel species No. | Type of heat treatment | Tempering temperature | Surface hardness (HV) | Surface carbon conc. (wt %) | $\gamma_R$ (v %) | Compressive residual stress (MPa) | Heat treat-ment cost | Wear resistance | Inner ring crack life (×10⁶ rev) | Presence of flaking |
|---|---|---|---|---|---|---|---|---|---|---|---|
| 3-1 | 14 | Carbonitridation | 270 | 705 | 0.9 | 1.5 | −220 | X | ○ | <100 | None |
| 3-2 | 15 | Carbonitridation | 270 | 700 | 0.9 | 1.5 | −200 | X | X | <100 | None |
| 3-3 | 16 | Carbonitridation | 270 | 705 | 0.8 | 3.0 | −180 | ○ | ○ | 100 or more | None |
| 3-4 | 17 | Carbonitridation | 270 | 720 | 1.0 | 2.0 | −200 | ○ | ○ | 100 or more | None |
| 3-5 | 18 | Carbonitridation | 300 | 730 | 1.1 | 0.5 | −220 | ○ | ◎ | 100 or more | None |
| 3-6 | 19 | Carbonitridation | 270 | 710 | 0.9 | 2.0 | −180 | ○ | ○ | 100 or more | None |
| 3-7 | 20 | Carbonitridation | 350 | 715 | 1.1 | 0.0 | −190 | ○ | ◎ | 100 or more | None |
| 3-8 | 21 | Carbonitridation | 240 | 720 | 1.3 | 1.5 | −210 | ○ | ○ | 100 or more | None |
| 3-9 | 22 | Carbonitridation | 270 | 700 | 0.9 | 1.0 | −150 | ○ | X | 46 | None |
| 3-10 | 23 | Carbonitridation | 270 | 700 | 1.4 | 2.0 | −140 | ○ | ○ | 39 | flaked |
| 3-11 | 10 | Dried Hardening | 270 | 630 | — | 0.0 | ≈0 | ◎ | ○ | 11 | flaked |

TABLE 8

| No. | Steel species | Type of heat treatment | Tempering temperature (° C.) | Surface hardness (HV) | Surface carbon conc. (wt %) | $\gamma_R$ (v %) | Compressive residual stress (MPa) | Size changing coefficient (%) | High temperature thrust life |
|---|---|---|---|---|---|---|---|---|---|
| 3-12 | 17 | Carbonitridation | 200 | 765 | 1.0 | 25 | −200 | 0.060 | 2.4 |
| 3-13 | 17 | Carbonitridation | 250 | 740 | 1.0 | 8.0 | −200 | 0.014 | 2.3 |
| 3-14 | 17 | Carbonitridation | 270 | 720 | 1.0 | 2.0 | −200 | 0.003 | 2.2 |
| 3-15 | 17 | Carbonitridation | 300 | 700 | 1.0 | 0.0 | −200 | 0.000 | 1.8 |
| 3-16 | 20 | Carbonitridation | 200 | 790 | 1.1 | 22 | −190 | 0.055 | 2.8 |
| 3-17 | 20 | Carbonitridation | 250 | 760 | 1.1 | 9.0 | −190 | 0.018 | 2.6 |
| 3-18 | 20 | Carbonitridation | 300 | 725 | 1.1 | 2.0 | −190 | 0.003 | 2.4 |
| 3-19 | 20 | Carbonitridation | 350 | 700 | 1.1 | 0.0 | −190 | 0.000 | 2.0 |
| 3-20 | 10 | Dried Hardening | 250 | 640 | 1.0 | 0.0 | ≈0 | 0.000 | 1 |

TABLE 9

| No. | Outer ring constitution | | | | | | | Bearing test result | |
|---|---|---|---|---|---|---|---|---|---|
| | Steel species No. | Heat treatment | Tempering temperature (° C.) | Surface hardness (HV) | Surface carbon concentration (wt %) | $\gamma_R$ (V %) | Compressive residual stress (MPa) | Inner ring constitution | $L_{10}$ life (Hr) | Outer ring fracture ratio (%) |
| 3-21 | 1 | Dried Hardening | 350 | 750 | — | 0.0 | ≈0 | ① | 33 | 20 |
| 3-22 | 2 | Hardening | 300 | 720 | — | 0.5 | ≈0 | ① | 31 | 30 |
| 3-23 | 4 | Hardening | 240 | 725 | — | 1.0 | ≈0 | ① | 30 | 25 |
| 3-24 | 5 | Hardening | 240 | 700 | — | 4.0 | ≈0 | ① | 17 | 70 |
| 3-25 | 6 | Hardening | 270 | 705 | — | 3.0 | ≈0 | ① | 16 | 75 |

TABLE 9-continued

| | | | | Outer ring constitution | | | | | Bearing test result | |
|---|---|---|---|---|---|---|---|---|---|---|
| No. | Steel species No. | Heat treatment | Tempering temperature (° C.) | Surface hardness (HV) | Surface carbon concentration (wt %) | $\gamma_R$ (V %) | Compressive residual stress (MPa) | Inner ring constitution | Outer ring $L_{10}$ life (Hr) | Outer ring fracture ratio (%) |
| 3-26 | 7 | Hardening | 350 | 680 | — | 0.0 | ≈0 | ① | 14 | 80 |
| 3-27 | 8 | Hardening | 300 | 695 | — | 2.0 | ≈0 | ① | 17 | 80 |
| 3-28 | 9 | Hardening | 350 | 705 | — | 6.0 | ≈0 | ① | 15 | 75 |
| 3-29 | 20 | Carbonitridation | 350 | 725 | 1.1 | 0.0 | −190 | ① | 32 | 50 |
| 3-30 | 3 | Dried Hardening | 350 | 730 | — | 2.0 | ≈0 | ② | 40 | 45 |

TABLE 10

| Steel species No. | Alloy ingredient (wt %) | | | | | |
|---|---|---|---|---|---|---|
| | C | Si | Mn | Cr | Mo | Mo/Cr |
| 1 | 1.00 | 1.00 | 0.30 | 1.00 | 1.20 | 1.20 |
| 2 | 0.80 | 1.50 | 0.50 | 0.70 | 1.40 | 2.00 |
| 3 | 0.95 | 2.00 | 0.40 | 0.70 | 0.80 | 1.14 |
| 4 | 1.05 | 0.50 | 0.40 | 1.15 | 1.30 | 1.13 |
| 5 | 0.75 | 1.20 | 0.40 | 0.80 | 0.85 | 1.06 |
| 6 | 1.10 | 0.40 | 0.70 | 1.50 | 1.00 | 0.67 |
| 7 | 0.85 | 1.00 | 0.60 | 0.65 | 1.00 | 1.54 |
| 8 | 1.00 | 0.50 | 0.50 | 1.20 | 0.75 | 0.63 |
| 9 | 0.90 | 2.00 | 0.40 | 1.80 | 0.60 | 0.33 |
| 20 | 0.60 | 1.00 | 0.40 | 1.09 | 1.20 | 1.10 |

TABLE 11

| Inner ring No. | Steel species No. | Type of heat treatment | Tempering temperature (° C.) | Surface hardness (HV) | Surface carbon conc. (wt %) | $\gamma_R$ (v %) | Compression residual stress |
|---|---|---|---|---|---|---|---|
| ① | 17 | Carbonitridation | 270 | 720 | 1.0 | 1.5 | −200 |
| ② | 20 | Carbonitridation | 350 | 725 | 1.1 | 0.0 | −190 |

INDUSTRIAL APPLICABILITY

As has been described above, the present invention provides a rolling bearing (first rolling bearing) having high wear resistance at high temperature as well as at room temperature, capable of improving rolling fatigue life and with reduced manufacturing cost.

Since the second rolling bearing according to the present invention has more satisfactory impact resistance (indentation resistance) that of existent rolling bearings, excellent acoustic characteristics are obtained even when impact loads are applied. Accordingly, a rolling bearing suitable to small-sized information equipments for portable use can be obtained.

Further, this invention provides a rolling bearing (third rolling bearing) capable of enduring such a use as used under application of high fitting stress exceeding 130 MPa to an inner ring.

Further, this invention provides a rolling bearing (fourth and fifth rolling bearings) capable of enduring such a use as used under application of high fitting stress exceeding 130 MPa to an inner ring, having a long life in a case of use under high temperature and lubrication with intrusion of obstacles and with reduced manufacturing cost.

What is claimed is:

1. A rolling bearing having an outer ring and an inner ring, the outer ring and the inner ring each having a raceway surface, or a shaft in a case where the inner ring raceway surface is formed to a shaft as bearing rings in which at least one of the inner ring (or the shaft) and the outer ring is formed of a steel material containing, as alloy ingredients, between 0.8% by weight and 1.2% by weight of C, between 0.5% by weight and 2.5% by weight of Si, between 0.7% by weight and 1.5% by weight of Cr, between 0.8% by weight and 2.0% by weight of Mo and between 0.3% by weight and 1.2% by weight of Mn into a predetermined shape, hardened and tempered, with a ratio of Mo to Cr (Mo/Cr; weight ratio) at a position from the raceway surface to a core portion by an amount corresponding to 2% of a diameter of a rolling element (position for 2% Da depth) being 1.1 or more, wherein a Vickers hardness (HV) at the position is 720 or more and the amount of the residual austenite at the position is 1.0% by volume or less.

2. A rolling bearing in which an inner ring having a first raceway surface is formed of a steel material containing, as alloy ingredients, between 0.3% by weight and 0.7% by weight of C and between 0.7% by weight and 1.5% by weight of Cr into a predetermined shape and then carbonitrided, hardened and tempered, wherein the Vickers hardness (HV) at the first raceway surface is 700 or more and an absolute value of a compressive residual stress on the raceway surface is 160 MPa or more, and at least one of an outer ring having a second raceway surface and a rolling element having a rolling surface is formed of a steel material containing, as alloy ingredients, between 0.8% by weight and 1.2% by weight of C, between 0.5% by weight and 2.5% by weight of Si, between 0.7% by weight and 1.5% by weight of Cr, between 0.8% by weight and 2.0% by weight of Mo and between 0.3% by weight and 1.2% by weight of Mn, with a ratio of Mo to Cr (Mo/Cr: weight ratio) of 1.1 or more into a predetermined shape, then hardened and tempered at a temperature of between 240° C. and 350° C., wherein the Vickers hardness (HV) at the second raceway surface and/or rolling surface is 720 or more.

3. A rolling bearing in which an inner ring having a first raceway surface is formed of a steel material containing, as alloy ingredients, between 0.3% by weight and 0.7% by weight of C, between 0.7% by weight and 1.5% by weight of Cr and between 0.8% by weight and 2.0% by weight of Mo, with a ratio of Mo to Cr (Mo/Cr: weight ratio) of 1.1 or more into a predetermined shape, then carbonitrided, hardened and tempered, wherein the Vickers hardness (HV) at the first raceway surface is 720 or more, and the absolute value for the compressive residual stress on the first raceway surface is 160 MPa or more, and at least one of an outer ring having a second raceway surface and a rolling element having a rolling surface is formed of a steel material containing, as alloy ingredients, between 0.8% by weight and 1.2% by weight of C, between 0.5% by weight and 2.5% by weight of Si, between 0.7% by weight and 1.5% by weight of Cr, between 0.8% by weight and 2.0% by weight of Mo and between 0.3% by weight and 1.2% by weight of Mn, with a ratio of Mo to Cr (Mo/Cr: weight ratio) of 1.1 or more into a predetermined shape, then hardened, and then tempered at a temperature of between 240° C. and 350° C., wherein the Vickers hardness (HV) at the second raceway surface and/or rolling surface is 720 or more.

4. A rolling bearing as defined in any one of claims 1, 2, or 3, wherein the amount of residual austenite on a raceway surface is 2.0% by volume or less for the inner ring and the outer ring.

5. A rolling bearing in which an inner ring is formed of a steel material containing, as alloy ingredients, between 0.3% by weight and 0.7% by weight of C and between 0.7% by weight and 1.5% by weight of Cr into a predetermined shape and then carbonitrided, hardened and tempered, wherein the Vickers hardness (HV) at a raceway surface of said inner ring is 700 or more and an absolute value of compressive residual stress on the raceway surface is 160 MPa or more and an outer ring is formed of a steel material containing as alloy ingredients, between 0.3% by weight and 0.7% by weight of C and between 0.7% by weight and 1.5% by weight of Cr into a predetermined shape and then carbonitrided, hardened and tempered, wherein the Vickers hardness (HV) at a raceway surface of said outer ring is 700 or more and an absolute value of compressive residual stress on the raceway surface of said outer ring is 160 MPa or more.

6. A rolling bearing as defined in claim 5, wherein the amount of residual austenite on a raceway surface is 2.0% by volume or less for the inner ring and the outer ring.

7. A rolling bearing having an inner ring, an outer ring and a rolling element, the inner ring and the outer ring each having a raceway surface and the rolling element having a rolling surface, in which at least one of the inner ring, the outer ring and the rolling element is formed of a steel material containing, as alloy ingredients, between 0.8% by weight and 1.2% by weight of C, between 0.5% by weight and 2.5% by weight of Si, between 0.7% by weight and 1.5% by weight of Cr, between 0.8% by weight and 2.0% by weight of Mo, and between 0.3% by weight and 1.2% by weight of Mn, with a ratio of Mo to Cr (Mo/Cr: weight ratio) of 1.1 or more into a predetermined shape, then subjected to hardening, and then tempered at a temperature of between 240° C. and 350° C., wherein the Vickers hardness (HV) at the raceway surface and/or rolling surface is 720 or more.

8. A rolling bearing in which an inner ring having a raceway surface is formed of a steel material containing, as alloy ingredients, between 0.3% by weight and 0.7% by weight of C, between 0.7% by weight and 1.5% by weight of Cr, and between 0.8% by weight and 2.0% by weight of Mo, with a ratio of Mo to Cr (Mo/Cr; weight ratio) 1.1 or more into a predetermined shape and then carbonitrided, hardened and tempered, wherein the Vickers hardness (HV) at the raceway surface is 700 or more and an absolute value of compressive residual stress on the raceway surface is 160 MPa or more.

9. A rolling bearing as defined in claim 8, wherein an outer ring having a raceway surface is formed of a steel material containing as alloy ingredients, between 0.3% by weight and 0.7% by weight of C and between 0.7% by weight and 1.5% by weight of Cr into a predetermined shape and then carbonitrided, hardened and tempered, wherein the Vickers hardness (HV) at the raceway surface of the outer ring is 700 or more and an absolute value of a compressive residual stress on the raceway surface is 160 MPa or more.

10. A rolling bearing as defined in claim 7, wherein the amount of residual austenite on the raceway surface is 2.0% by volume or less for the inner ring and the outer ring.

11. A rolling bearing as defined in claim 9, wherein the amount of residual austenite on the raceway surface is 2.0% by volume or less for the inner ring and the outer ring.

* * * * *